US009541752B2

(12) United States Patent
Saito et al.

(10) Patent No.: US 9,541,752 B2
(45) Date of Patent: Jan. 10, 2017

(54) OPTICAL FILTER DEVICE, OPTICAL MODULE, AND ELECTRONIC APPARATUS

(71) Applicant: Seiko Epson Corporation, Tokyo (JP)

(72) Inventors: Daisuke Saito, Matsumoto (JP); Yasushi Matsuno, Matsumoto (JP)

(73) Assignee: Seiko Epson Corporation (JP)

( * ) Notice: Subject to any disclaimer, the term of this patent is extended or adjusted under 35 U.S.C. 154(b) by 72 days.

(21) Appl. No.: 14/170,862

(22) Filed: Feb. 3, 2014

(65) Prior Publication Data
US 2014/0218802 A1   Aug. 7, 2014

(30) Foreign Application Priority Data
Feb. 5, 2013   (JP) ................ 2013-020163

(51) Int. Cl.
*G02B 26/00* (2006.01)
*G01J 3/26* (2006.01)
*G01J 3/51* (2006.01)

(52) U.S. Cl.
CPC .............. *G02B 26/001* (2013.01); *G01J 3/26* (2013.01); *G01J 3/51* (2013.01)

(58) Field of Classification Search
CPC .............. G02B 26/001; G02B 6/29359; G02B 5/28–5/289; G01J 3/26; G01J 3/51
USPC ................. 333/202; 359/577–590, 290–295, 359/260–261; 356/454, 506, 519
See application file for complete search history.

(56) References Cited

U.S. PATENT DOCUMENTS 6,373,632 B1 *   4/2002   Flanders .................. 359/578
6,961,182 B2 *   11/2005  Murata .................... 359/578

2005/0122191 A1 *   6/2005   Nakamura et al. ........... 333/202
2008/0062426 A1 *   3/2008   Yoshida ..................... 356/454
2010/0207217 A1 *   8/2010   Zuniga-Ortiz et al. ....... 257/415
2012/0206731 A1 *   8/2012   Sano ..................... G01J 3/26
                                                             356/450

FOREIGN PATENT DOCUMENTS

| JP | 11-142245 | 5/1999 |
| JP | 2003-209315 A | 7/2003 |
| JP | 2005-079146 A | 3/2005 |
| JP | 2005-165067 A | 6/2005 |
| JP | 2008-070163 A | 3/2008 |
| JP | 2012-141347 A | 7/2012 |
| JP | 2012-141348 A | 7/2012 |
| JP | 2012-185427 A | 9/2012 |

* cited by examiner

*Primary Examiner* — Scott J Sugarman
*Assistant Examiner* — Kristina Deherrera
(74) *Attorney, Agent, or Firm* — Harness, Dickey & Pierce, P.L.C.

(57) ABSTRACT

An optical filter device has a light interference filter and a casing. The light interference filter has a fixed substrate, a movable substrate joined to the fixed substrate, a fixed reflection film provided on the fixed substrate, and a movable reflection film provided on the movable substrate. The casing has a base substrate and a lid that forms an internal space with the base substrate. The movable substrate has a holding portion provided on a surface opposite to the fixed substrate, outside a light interference region, as viewed in a plan view. The base substrate has a light transmission hole corresponding to a light transmission region. An outer peripheral edge of the light transmission hole faces the holding portion. The surface opposite to the fixed substrate of the movable substrate is joined to the base substrate.

8 Claims, 9 Drawing Sheets

OPTICAL FILTER DEVICE, OPTICAL MODULE, AND ELECTRONIC APPARATUS

BACKGROUND

1. Technical Field

The present invention relates to an optical filter device, an optical module, and an electronic apparatus.

2. Related Art

Traditionally, a variable-wavelength interference filter in which reflection films are arranged to face each other via a predetermined gap, on surfaces facing each other of a pair of substrates, is known. Also, an optical filter device having such a variable-wavelength interference filter housed in a casing is known (see, for example, JP-A-2008-70163).

The optical filter device disclosed in JP-A-2008-70163 has a package (casing) that includes a plate-like pedestal (base substrate) and a cylindrical cap. In this casing, a peripheral edge portion of the base substrate and one end portion of the cylinder of the cap are welded or bonded and thus connected together, and a space for housing the variable-wavelength interference filter is provided between the base substrate and the cap. A hole is provided in a top surface of the cap that is opposite to the pedestal, and a window portion for transmitting light is provided in this hole.

By the way, a light transmission hole may be provided not only in the cap as in JP-A-2008-70163 but also in the base substrate. However, parallelism of the base substrate may be impaired in the processing to form the light transmission hole or the like. For example, a curvature, protrusion or the like is generated near an outer peripheral edge of the light transmission hole. If the base substrate with the impaired parallelism and the variable-wavelength interference filter are joined together, the curving part or protruding part locally contacts the joining surface of the variable-wavelength interference filter and therefore prevents horizontal fixture of the variable-wavelength interference filter. Consequently, there is a problem that resolution is lowered.

SUMMARY

An advantage of some aspects of the invention is that an optical filter device, an optical module and an electronic apparatus with high spectroscopic accuracy can be provided.

An optical filter device according to an aspect of the invention includes: a light interference filter having a first substrate, a second substrate facing the first substrate, a first reflection film that is provided on the first substrate, reflects a part of incident light and transmits a part of the incident light, and a second reflection film that is provided on the second substrate, faces the first reflection film, reflects a part of incident light and transmits a part of the incident light; and a casing having a base substrate that fixes the light interference filter, and a lid that is joined to the base substrate and forms an internal space capable of housing the light interference filter between the base substrate and the lid. The second substrate has an annular recessed portion provided on a surface opposite to the first substrate, outside a light interference region where the first reflection film and the second reflection film overlap with each other, as viewed in a plan view of the first substrate and the second substrate seen from a direction of substrate thickness. The base substrate has a light transmission hole corresponding to a light transmission region. An outer peripheral edge of the light transmission hole faces the annular recessed portion. The surface opposite to the first substrate of the second substrate is joined to the base substrate.

According to this aspect of the invention, the light interference filter is joined to the base substrate in such a way that the outer peripheral edge of the light transmission hole faces the annular recessed portion. With such a configuration, for example, even in the case where a base substrate with impaired parallelism due to a curvature, protrusion or the like generated near the outer peripheral edge of the light transmission hole and the light interference filter are joined together, the periphery of the outer peripheral edge of the light transmission hole faces the annular recessed portion and therefore local contact of the curving portion or protruding portion with the joining surface of the light interference filter can be avoided. Thus, light interference filter can be joined horizontally to the base substrate and high spectroscopic accuracy can be realized.

In the optical filter device, it is preferable that the light interference filter has a gap change unit that changes a gap dimension between the first reflection film and the second reflection film.

According to this configuration, the light interference filter has the gap change unit. As a voltage applied to the gap change unit is changed, the gap dimension between the reflection films can be varied and the wavelength of light that is taken out can be changed.

In the optical filter device, it is preferable that the second substrate and the base substrate are joined together via an adhesive layer.

According to this configuration, the second substrate and the base substrate are joined together via the adhesive layer. With such a configuration, a spacing corresponding to the thickness of the adhesive layer is provided between the base substrate and the second substrate. Therefore, a stress based on the shape of the base substrate is not transmitted to the second substrate.

In the optical filter device, it is preferable that the light transmission hole of the base substrate differs in size between a surface side facing the second substrate and a surface side opposite to the second substrate, that an outer peripheral edge of the light transmission hole on the surface side facing the second substrate faces the annular recessed portion, and that the annular recessed portion is situated on the outer side of an outer peripheral edge of the light transmission hole on the surface side opposite to the second substrate, as viewed in the plan view.

According to this configuration, the light interference filter is joined to the base substrate in such a way that the outer peripheral edge of the light transmission hole on the surface side facing the second substrate faces the annular recessed portion and that the annular recessed portion is situated on the outer side of the outer peripheral edge of the light transmission hole on the surface side opposite to the second substrate, as viewed in the plan view.

With such a configuration, since the outer peripheral edge on the surface side facing the second substrate faces the annular recessed portion, local contact of the curving portion or protruding portion with the joining surface of the light interference filter can be avoided. Also, since the outer peripheral edge on the surface side opposite to the second substrate is arranged in such a way that the annular recessed portion is situated on the outer side of the outer peripheral edge, even if light becomes incident on the device, the light does not enter into the annular recessed portion. Therefore, generation of stray light due to incidence of light on the annular recessed portion can be prevented and light with a desired target wavelength can be taken out.

It is preferable that the optical filter device has a glass cover provided on a surface opposite to the second substrate of the base substrate and covering the light transmission hole, that the glass cover has a larger recessed portion than the light transmission hole, provided on a surface facing the base substrate, and that the outer peripheral edge of the light transmission hole is situated inside the recessed portion.

According to this configuration, even in the case where parallelism of the base substrate is not maintained, for example, where a curvature, protrusion or the like is generated on the outer peripheral edge of the light transmission hole, local contact of the curving portion or protruding portion can be avoided via the recessed portion provided on the glass cover. Therefore, the glass cover can be joined horizontally to the base substrate. Consequently, the glass cover and the light interference filter can be arranged in parallel.

In the optical filter device, it is preferable that the glass cover is joined to the base substrate via a spacer.

According to this configuration, the glass cover and the base substrate are joined together via the spacer. With such a configuration, even in the case where parallelism of the base substrate is impaired, causing the curving portion or protruding portion to locally contact the recessed portion of the glass cover, the local contact can be avoided by height adjustment via the spacer.

An optical modules according to an aspect of the invention includes: a light interference filter having a first substrate, a second substrate facing the first substrate, a first reflection film that is provided on the first substrate, reflects a part of incident light and transmits a part of the incident light, a second reflection film that is provided on the second substrate, faces the first reflection film, reflects a part of incident light and transmits a part of the incident light, and a gap change unit that changes a gap dimension between the first reflection film and the second reflection film; a casing having a base substrate that fixes the light interference filter, and a lid that that is joined to the base substrate and forms an internal space capable of housing the light interference filter between the base substrate and the lid; and a detection unit that detects light taken out by the light interference filter. The second substrate has an annular recessed portion provided on a surface opposite to the first substrate, outside a light interference region where the first reflection film and the second reflection film overlap with each other, as viewed in a plan view of the first substrate and the second substrate seen from a direction of substrate thickness. The base substrate has a light transmission hole corresponding to a light transmission region. An outer peripheral edge of the light transmission hole faces the annular recessed portion. The surface opposite to the first substrate of the second substrate is joined to the base substrate.

According to this configuration, as in the foregoing configuration, the light interference filter can be joined horizontally to the base substrate and high spectroscopic accuracy can be realized. Therefore, as the light taken out from the light interference filter is detected by the detection unit, the amount of light with a desired specific wavelength can be detected accurately.

An electronic apparatus according to an aspect of the invention includes: a light interference filter having a first substrate, a second substrate facing the first substrate, a first reflection film that is provided on the first substrate, reflects a part of incident light and transmits a part of the incident light, a second reflection film that is provided on the second substrate, faces the first reflection film, reflects a part of incident light and transmits a part of the incident light, and a gap change unit that changes a gap dimension between the first reflection film and the second reflection film; and a casing having a base substrate that fixes the light interference filter, and a lid that is joined to the base substrate and forms an internal space capable of housing the light interference filter between the base substrate and the lid. The second substrate has an annular recessed portion provided on a surface opposite to the first substrate, outside a light interference region where the first reflection film and the second reflection film overlap with each other, as viewed in a plan view of the first substrate and the second substrate seen from a direction of substrate thickness. The base substrate has a light transmission hole corresponding to a light transmission region. An outer peripheral edge of the light transmission hole faces the annular recessed portion. The surface opposite to the first substrate of the second substrate is joined to the base substrate.

According to this configuration, as in the foregoing configuration, the light interference filter can be joined horizontally to the base substrate and high spectroscopic accuracy can be realized. Therefore, light with a target wavelength can be taken out by the light interference filter with high resolution, and highly accurate electronic processing (for example, chromaticity measurement and component analysis or the like) can be carried out with the light that is taken out.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of the invention will be described with reference to the drawings.

1. Configuration of Optical Filter Device

Figure 1:
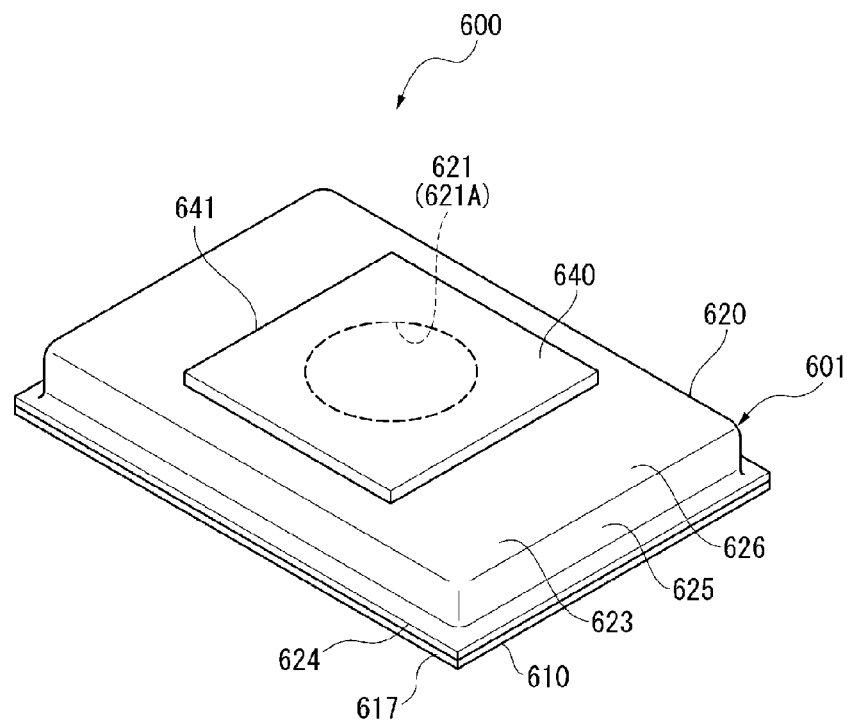
FIG. 1 is a perspective view showing the schematic configuration of an optical filter device according to a first embodiment of the invention.
Figure 2:
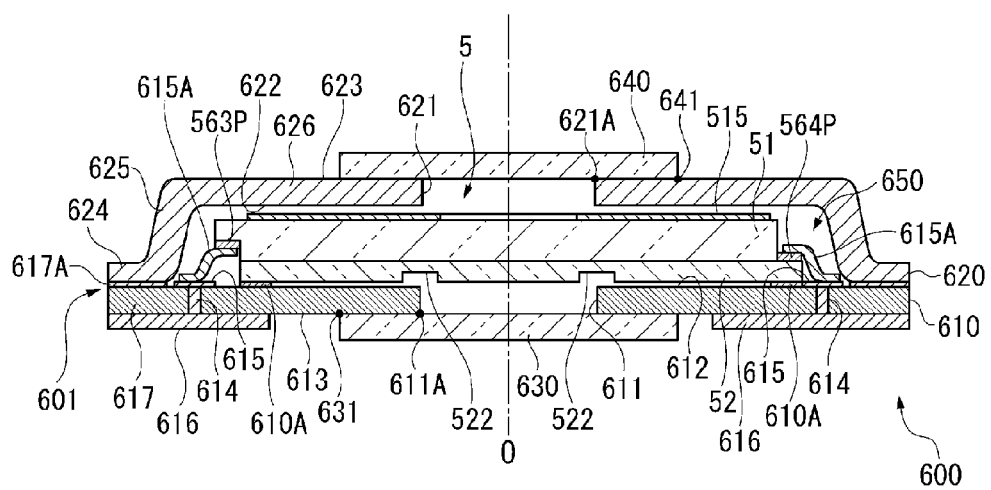
FIG. 2 is a sectional view showing the schematic configuration of the optical filter device according to the first embodiment.

FIG. 1 is a perspective view showing the schematic configuration of an optical filter device 600 according to a first embodiment of the invention. FIG. 2 is a sectional view of the optical filter device 600.

The optical filter device 600 is a device that takes out light with a predetermined target wavelength from inspection target light incident thereon and causes the resulting light to exit. The optical filter device 600 has a casing 601 and a variable-wavelength interference filter 5 (see FIG. 2) housed inside the casing 601. Such an optical filter device 600 can be incorporated in, for example, an optical module such as a color measurement sensor, or an electronic apparatus such as a color measurement device or gas analyzer. The configuration of an optical module or electronic apparatus having the optical filter device 600 will be described in a second embodiment, later described.

2. Configuration of Variable-Wavelength Interference Filter

Figure 3:
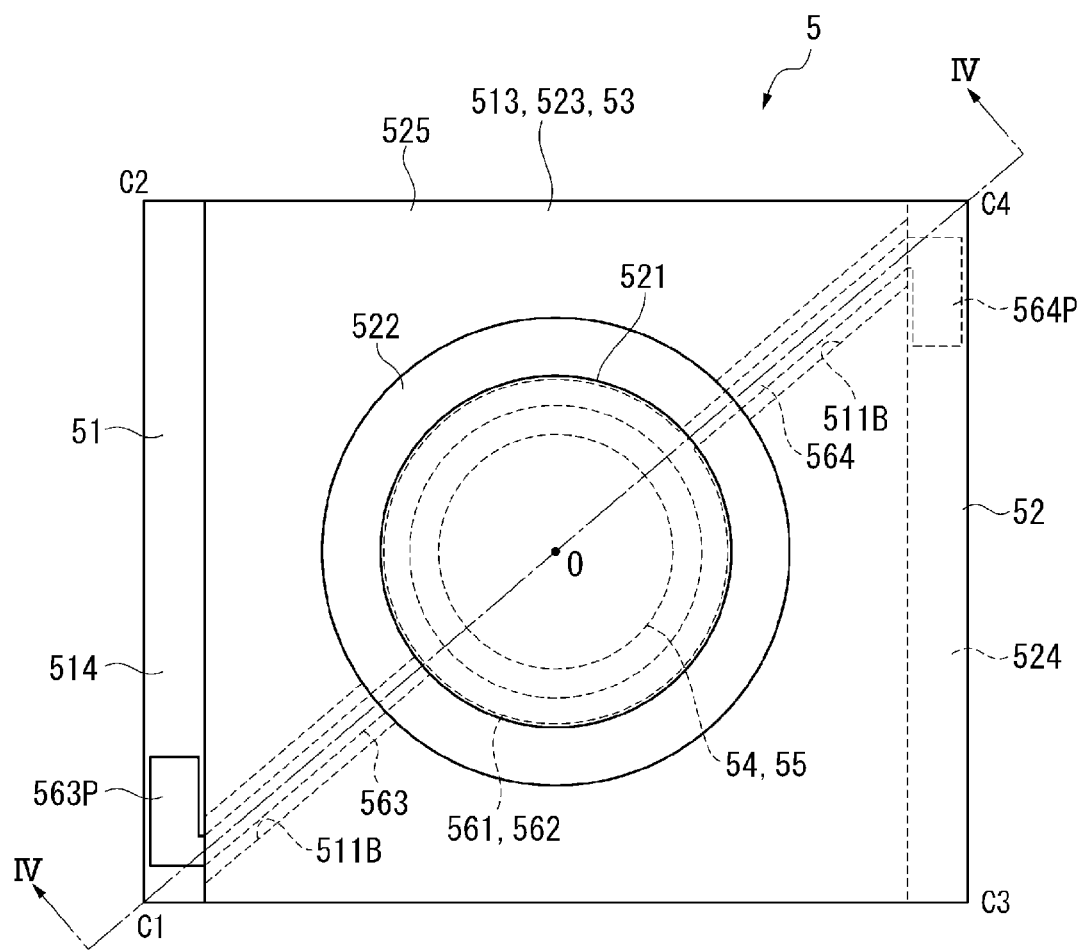
FIG. 3 is a plan view showing the schematic configuration of an interference filter housed in the optical filter device according to the first embodiment.
Figure 4:
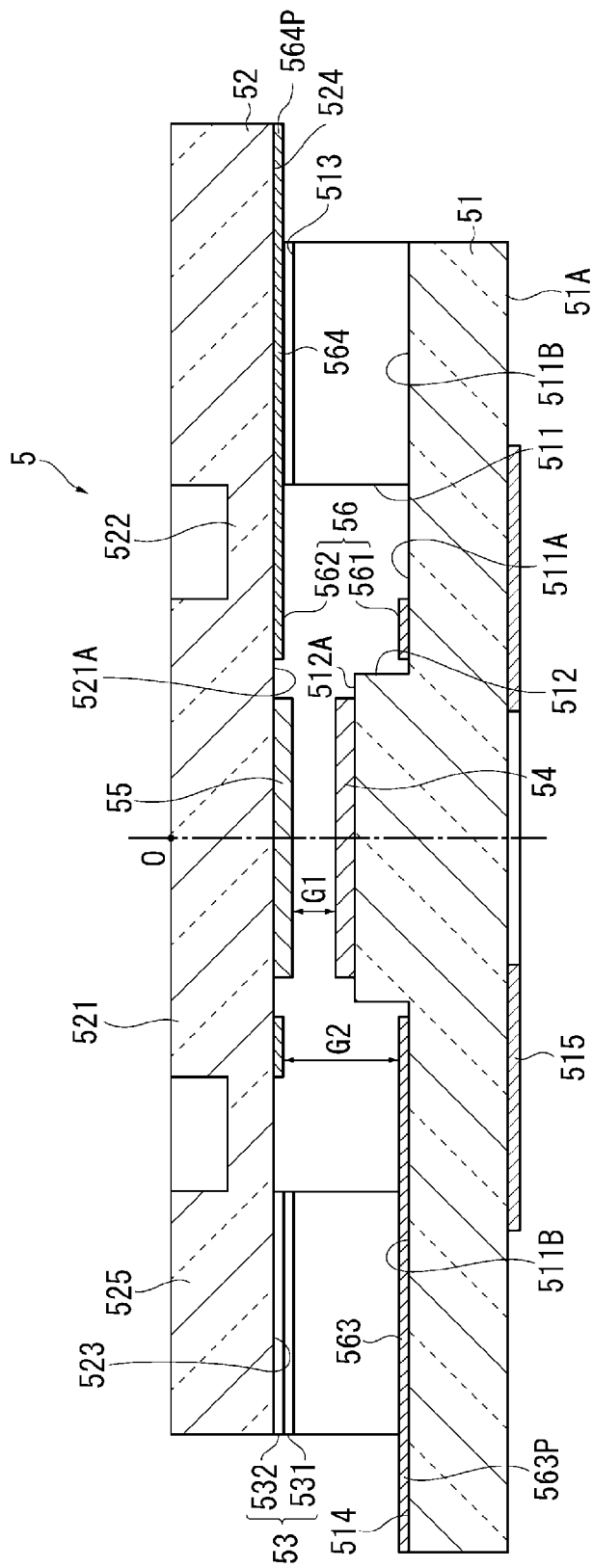
FIG. 4 is a sectional view showing the schematic configuration of the interference filter according to the first embodiment.

The variable-wavelength interference filter 5 forms a light interference filter according to the invention. FIG. 3 is a plan view showing the schematic configuration of the variable-wavelength interference filter 5 provided in the optical filter device 600. FIG. 4 is a sectional view showing the schematic configuration of the variable-wavelength interference filter 5, taken along IV-IV in FIG. 3.

As shown in FIG. 3, the variable-wavelength interference filter 5 is, for example, a rectangular plate-like optical member. This variable-wavelength interference filter 5 has a fixed substrate 51 as a first substrate according to the invention, and a movable substrate 52 as a second substrate according to the invention. Each of the fixed substrate 51 and the movable substrate 52 is made of, for example, various kinds of glass such as soda-lime glass, crystalline glass, quartz glass, lead glass, potassium glass, borosilicate glass or non-alkaline glass, or rock crystal. The fixed substrate 51 and the movable substrate 52 are integrally formed as a first joining portion 513 of the fixed substrate 51 and a second joining portion 523 of the movable substrate are joined together via a joining film 53 (a first joining film 531 and a second joining film 532) formed, for example, by a plasma polymerized film containing siloxane as a principal component, or the like.

In the following description, a plan view seen from the direction of substrate thickness of the fixed substrate 51 or the movable substrate 52, that is, a plan view of the variable-wavelength interference filter 5 seen from the direction in which the fixed substrate 51, the joining film 53 and the movable substrate 52 are stacked, is referred to as a filter plan view.

A fixed reflection film 54 forming the first reflection film according to the invention is provided on the fixed substrate 51. A movable reflection film 55 forming the second reflection film according to the invention is provided on the movable substrate 52. The fixed reflection film 54 and the movable reflection film 55 are arranged to face each other via an inter-reflection film gap G1. In the variable-wavelength interference filter 5, an electrostatic actuator 56 used to adjust the length (dimension) of the inter-reflection film gap G1 is provided. The electrostatic actuator 56 includes a fixed electrode 561 provided on the fixed substrate 51 and a movable electrode 562 provided on the movable substrate 52. The fixed electrode 561 and the movable electrode 562 face each other via an inter-electrode gap G2 (G2>G1). Here, the electrodes 561, 562 may be directly provided on the substrates surfaces of the fixed substrate 51 and the movable substrate 52, respectively, or may be provided via another film member.

In this embodiment, a configuration in which the inter-reflection film gap G1 is smaller than the inter-electrode gap G2 is illustrated. However, for example, depending on the wavelength range transmitted through the variable-wavelength interference filter 5, the inter-reflection film gap G1 may be made larger than the inter-electrode gap G2.

In the filter plan view, one side of the fixed substrate 51 (for example, a side between vertices C1 and C2 in FIG. 3) protrudes outward from the movable substrate 52. Of this protruding part, a surface that is exposed when the variable-wavelength interference filter 5 is viewed from the side of the movable substrate 52 forms a first electric installation surface 514.

Also, in the filter plan view, one side facing the first electric installation surface 514 (a side between vertices C3 and C4), of the sides of the movable substrate 52, protrudes outward from the fixed substrate 51. Of this protruding part, a surface that is exposed when the variable-wavelength interference filter 5 is viewed from the side of the fixed substrate 51 forms a second electric installation surface 524.

2-1. Configuration of Fixed Substrate

The fixed substrate 51 is formed, for example, by processing a glass base member with a thickness of 500 μm. Specifically, as shown in FIG. 4, an electrode arrangement groove 511 and a reflection film installation portion 512 are formed by etching on the fixed substrate 51. The fixed substrate 51 is formed to a larger thickness dimension than the movable substrate 52 and therefore there is no flexure of the fixed substrate 51 due to an electrostatic attraction generated when a voltage is applied between the fixed electrode 561 and the movable electrode 562 or due to internal stress of the fixed electrode 561.

The electrode arrangement groove 511 is formed annularly about a center point O of the variable-wavelength interference filter 5, as viewed in the filter plan view. The reflection film installation portion 512 is formed protruding toward the movable substrate 52 from a central part of the electrode arrangement groove 511, as viewed in the plan view. Here, a groove bottom surface of the electrode arrangement groove 511 is an electrode installation surface 511A where the fixed electrode 561 is arranged. A protruding distal end surface of the reflection film installation portion 512 is a reflection film installation surface 512A.

Also, on the fixed substrate 51, an electrode lead-out groove 511B extending from the electrode arrangement groove 511 toward the first electric installation surface 514 and the second electric installation surface 524 is provided.

The fixed electrode 561 is provided on the electrode installation surface 511A of the electrode arrangement groove 511. The fixed electrode 561 is provided in a region facing the movable electrode 562 of a movable portion 521, later described, of the electrode installation surface 511A. Also, an insulating film to secure insulation between the fixed electrode 561 and the movable electrode 562 may be stacked on the fixed electrode 561.

On the fixed substrate 51, a fixed lead-out electrode 563 extending from an outer peripheral edge of the fixed electrode 561 to the first electric installation surface 514 through the electrode lead-out groove 511B is provided. An extending distal end portion of the fixed lead-out electrode 563 (a portion situated at the vertex C1 of the fixed substrate 51) forms a fixed electrode pad 563P on the first electric installation surface 514.

In this embodiment, a configuration in which one fixed electrode 561 is provided on the electrode installation surface 511A is described. However, for example, a configuration in which two electrodes that are concentric about the center point O in the plan view are provided (double-electrode configuration) may also be employed.

The reflection film installation portion 512 is formed substantially in a columnar shape coaxial with the electrode arrangement groove 511 and smaller in diameter dimension than the electrode arrangement groove 511, and has the reflection film installation surface 512A facing the movable substrate 52 of the reflection film installation portion 512, as described above.

The fixed reflection film 54 is installed on the reflection film installation portion 512, as shown in FIG. 4. As the fixed reflection film 54, for example, a metal film of Ag or the like, or an alloy film of an Ag alloy or the like can be used. Also, a dielectric multilayer film including a high refractive layer of $TiO_2$ and a low refractive layer of $SiO_2$ may be used. Moreover, a reflection film in which a metal film (or alloy film) is stacked on a dielectric multilayer film, a reflection film in which a dielectric multilayer film is stacked on a metal film (or alloy film), a reflection film in which a single-layer refractive layer ($TiO_2$, $SiO_2$ or the like) and a metal film (or alloy film) are stacked on each other, or the like may be used.

On a light incident surface 51A (a surface where the fixed reflection film 54 is not provided) of the fixed substrate 51, an antireflection film may be formed at a position corresponding to the fixed reflection film 54. The antireflection film can be formed by alternately stacking a low-refractive index film and a high-refractive index film. The antireflection film lowers the reflectance of visible light on the surface of the fixed substrate 51 and increases the transmittance thereof.

Moreover, on the light incident surface 51A of the fixed substrate 51, for example, a non-light-transmissive member 515 made of Cr or the like is provided. The non-light-transmissive member 515 is formed annularly and is preferably formed in the shape of a circular ring. The ring inner diameter of the non-light-transmissive member 515 is set to be an effective diameter for causing the fixed reflection film 54 and the movable reflection film 55 to interfere light. Thus, the non-light-transmissive member 515 functions as an aperture to reduce incident light that becomes incident on the optical filter device 600.

Of the surface facing the movable substrate 52 of the fixed substrate 51, a surface where the electrode arrangement groove 511, the reflection film installation portion 512 and the electrode lead-out groove 511B are not formed by etching forms the first joining portion 513. The first joining film 531 is formed on the first joining portion 513. As the first joining film 531 is joined to the second joining film 532 provided on the movable substrate 52, the fixed substrate 51 and the movable substrate 52 are jointed together, as described above.

2-2. Configuration of Movable Substrate

The movable substrate 52 is formed, for example, by processing a glass base member with a thickness of 200 μm by etching or the like.

Specifically, the movable substrate 52 has the circular movable portion 521 about the plan center point O in the filter plan view as shown in FIG. 3, a holding portion 522 provided on the outside of the movable portion 521 and holding the movable portion 521, and a substrate outer peripheral portion 525 provided on the outside of the holding portion 522.

The movable portion 521 is formed to a greater thickness dimension than the holding portion 522. For example, in this embodiment, the movable portion 521 is formed to the same thickness dimension as the movable substrate 52. The movable portion 521 is formed to a diameter dimension that is at least larger than the diameter dimension of the outer peripheral edge of the reflection film installation surface 512A as viewed in the filter plan view. The movable electrode 562 and the movable reflection film 55 are provided on the movable portion 521.

Similarly to the fixed substrate 51, an antireflection film may be formed on the surface opposite to the fixed substrate 51 of the movable portion 521. The antireflection film can be formed by alternately stacking a low-refractive index film and a high-refractive index film. The antireflection film can lower the reflectance of visible light on the surface of the movable substrate 52 and increase the transmittance thereof.

The movable electrode 562 faces the fixed electrode 561 via the inter-electrode gap G2 and is formed annularly in the same shape as the fixed electrode 561. Also, a movable lead-out electrode 564 extending from the outer peripheral edge of the movable electrode 562 toward the second electric installation surface 524 is provided on the movable substrate 52. An extending distal end portion of the movable lead-out electrode 564 (a portion situated at the vertex C4 of the movable substrate 52) forms a movable electrode pad 564P on the second electric installation surface 524.

The movable reflection film 55 is provided at a central part of a movable surface 521A of the movable portion 521, facing the fixed reflection film 54 via the inter-reflection film gap G1. As the movable reflection film 55, a reflection film having the same configuration as the fixed reflection film 54 is used.

The holding portion 522 is a diaphragm surrounding the movable portion 521 and is formed annularly as viewed in the filter plan view. The holding portion 522 is formed to a smaller thickness dimension than the movable portion 521. The holding portion 522 is formed at a position faced by the outer peripheral edge of a light transmission hole 611 of a base substrate 610, later described.

Such a holding portion 522 is more flexible than the movable portion 521 and can displace the movable portion 521 toward the fixed substrate 51 with a very small electrostatic attraction. In this case, since the movable portion 521 has a larger thickness dimension and higher rigidity than the holding portion 522, no change occurs in the shape of the movable portion 521 even when the holding portion 522 is pulled toward the fixed substrate 51 by an electrostatic attraction. Therefore, there is no flexure of the movable reflection film 55 provided on the movable portion 521, and the fixed reflection film 54 and the movable reflection film 55 can be constantly maintained in a parallel state.

The substrate outer peripheral portion 525 is provided on the outside of the holding portion 522 as viewed in the filter plan view, as described above. A surface facing the fixed substrate 51 of the substrate outer peripheral portion 525 has the second joining portion 523 that faces the first joining portion 513. The second joining film 532 is provided on the second joining portion 523. As the second joining film 532 is joined to the first joining film 531, as described above, the fixed substrate 51 and the movable substrate 52 are joined together.

3. Configuration of Casing

Back to FIGS. 1 and 2, the casing 601 has a base substrate 610, a lid 620, a base-side glass substrate 630 (glass cover), and a lid-side glass substrate 640.

The base substrate 610 is formed, for example, by a single-layer ceramic substrate. On the base substrate 610, the movable substrate 52 of the variable-wavelength interference filter 5 is installed. To install the movable substrate 52 on the base substrate 610, for example, the movable substrate 52 may be arranged via an adhesive layer 610A or the like. The movable substrate 52 may also be arranged by being fitted with another fixing member or the like.

In the base substrate 610, a light transmission hole 611 is opened in a region facing the reflection films (the fixed reflection film 54, the movable reflection film 55) of the variable-wavelength interference filter 5. The light transmission hole 611 is formed in at such a position that an outer peripheral edge of the light transmission hole 611 faces the holding portion 522 of the movable substrate 52.

On a base inner surface 612 facing the lid 620 (lid facing surface) of the base substrate 610, an inner terminal portion 615 connected to each electrode pad 563P, 564P on the first electric installation surface 514 and the second electric installation surface 524 of the variable-wavelength interference filter 5 is provided. To connect each electrode pad 563P, 564P and the inner terminal portion 615 to each other, for example, FPC (flexible printed circuits) 615A can be used, and the components are joined, for example, with an Ag paste, ACF (anisotropic conductive film), ACP (anisotropic conductive paste) or the like. It is preferable to use Ag paste which has little degassing (discharge of gas) in order to maintain the internal space 650 in a vacuum state. The connection is not limited to the connection by the FPC 615A, and, for example, wire connection can be carried out by wire bonding.

Also, in the base substrate 610, a through-hole 614 is formed corresponding to the position where each inner terminal portion 615 is provided. Each inner terminal portion 615 is connected via the through-hole 614 to an outer terminal portion 616 provided on a base outer surface 613 opposite to the base inner surface 612 of the base substrate 610. Here, the through-hole 614 is filled with a metal member (for example, Ag paste or the like) connecting the inner terminal portion 615 and the outer terminal portion 616, and airtightness of an internal space 650 of the casing 601 is maintained.

On an outer peripheral portion of the base substrate 610, a base joining portion 617 joined to the lid 620 is provided.

The lid 620 has a lid joining portion 624 joined to the base joining portion 617 of the base substrate 610, a sidewall portion 625 continuing from the lid joining portion 624 and standing up in a direction away from the base substrate 610, and a top portion 626 continuing from the sidewall portion 625 and covering the side of the fixed substrate 51 of the variable-wavelength interference filter 5, as shown in FIGS. 1 and 2. The lid 620 can be made of an alloy such as Kovar or a metal.

The lid 620 is tightly joined to the base substrate 610 as the lid joining portion 624 and the base joining portion 617 of the base substrate 610 are joined together.

As a joining method for this, for example, laser welding, soldering with a silver brazing filler, sealing with an eutectic alloy, welding with low-melting glass, glass adhering, glass frit bonding, adhering with an epoxy resin or the like can be employed. A suitable method can be selected from these joining methods, according to the components such as the base substrate 610 and the lid 620 and the joining environment or the like.

In this embodiment, a joining pattern 617A made of, for example, Ni, Au or the like, is formed on the base joining portion 617 of the base substrate 610, and a high-output laser (for example, YAG laser or the like) is cast onto the joining pattern 617A and the lid joining portion 624, thus performing laser bonding.

The top portion 626 of the lid 620 is parallel to the base substrate 610. In the top portion 626, a light transmission hole 621 is opened in a region facing each reflection film 54, 55 of the variable-wavelength interference filter 5.

In this embodiment, light becomes incident trough the light transmission hole 621 of the lid 620, and the light taken out by the variable-wavelength interference filter 5 exits through the light transmission hole 611 of the base substrate 610. In such a configuration, of the light incident through the light transmission hole 621, only the light in the effective diameter of the non-light-transmissive member 515 provided on the light incident surface 51A of the variable-wavelength interference filter 5 becomes incident on the fixed reflection film 54 and the movable reflection film 55. Particularly, the substrates 51, 52 of the variable-wavelength interference filter 5 are shaped by etching and a curved portion is formed in the etched parts due to the influence of side-etching. If light becomes incident on such a curved portion, the light may become a stray light and exit through the light transmission hole 611. Meanwhile, in this embodiment, generation of such a stray light can be prevented by the non-light-transmissive member 515 and light with a desired target wavelength can be taken out.

The base-side glass substrate 630 is a glass substrate joined to the side of the base outer surface 613 of the base substrate 610, covering the light transmission hole 611. The base-side glass substrate 630 is formed in a larger size than the light transmission hole 611 and is arranged in such a way that the plan center point O of the base-side glass substrate 630 coincides with the plan center point O of the light transmission hole 611. This plan center point O coincides with the plan center point O of the variable-wavelength interference filter 5 and coincides with the plan center point O of the fixed reflection film 54, the movable reflection film 55, and the ring inner peripheral edge of the non-light-transmissive member 515. Of the base-side glass substrate 630, a region on the outer side of an outer peripheral edge 611A of the light transmission hole 611 (a region from the outer peripheral edge 611A to a substrate edge 631 of the base-side glass substrate 630) is joined to the base substrate 610, as viewed in a plan view of the optical filter device 600 seen from the direction of thickness of the base substrate 610 (base-side glass substrate 630).

Similarly, the lid-side glass substrate 640 is a glass substrate joined to the side of the lid inner surface 622 opposite to the light transmission hole 621 facing the base substrate 610 of the lid 620, covering the light transmission hole 621. The lid-side glass substrate 640 is formed in a larger than size than the light transmission hole 621 and is arranged in such a way that the plan center point O of the lid-side glass substrate 640 coincides with the plan center point O of the light transmission hole 621. Of the lid-side glass substrate 640, a region on the outer side of an outer peripheral edge 621A of the light transmission hole 621 (a region from the outer peripheral edge 621A to a substrate edge 641 of the lid-side glass substrate 640) is joined to the lid 620, as viewed in a plan view of the optical filter device 600 seen from the direction of thickness of the base substrate 610 (lid-side glass substrate 640).

To join the base substrate 610 and the base-side glass substrate 630 and to join the lid 620 and the lid-side glass substrate 640, for example, glass frit bonding using glass frit that is glass pieces formed by melting a glass material at a high temperature and then quickly cooling the melted glass material, can be used. In such glass frit bonding, no gap is generated in the joining portion. Also, since glass frit which has little degassing (gas discharge) is used, the internal space 650 can be maintained in a vacuum state. Possible joining methods are not limited to glass frit bonding, and welding with a low-melting glass, glass sealing or the like may be used. Also, bonding with an epoxy resin or the like may be used.

As described above, in the optical filter device 600 of this embodiment, airtightness of the internal space 650 of the casing 601 is maintained by the joining of the base substrate 610 and the lid 620, the joining of the base substrate 610 and the base-side glass substrate 630, and the joining of the lid 620 and the lid-side glass substrate 640.

Method for Manufacturing Optical Filter Device

Next, a method for manufacturing the above optical filter device 600 will be described with reference to the drawings.

In manufacturing the optical filter device 600, first, a filter preparation process to manufacture the variable-wavelength interference filter 5 constituting the optical filter device 600, a base substrate preparation process, and a lid preparation process are carried out.

Filter Preparation Process

In the filter preparation process, first, a filter to manufacturing the variable-wavelength interference filter 5 is formed.

First, the fixed substrate 51 and the movable substrate 52 are formed suitably by etching or the like. The holding portion 522 of the movable substrate 52 is formed at a position faced by the outer peripheral edge of the light transmission hole 611 of the base substrate 610, later described. On the fixed substrate 51, after the fixed electrode 561 and the fixed lead-out electrode 563 are deposited, the non-light-transmissive member 515 is deposited and then the fixed reflection film 54 is deposited. On the movable substrate 52, after the movable electrode 562 is deposited, the movable reflection film 55 is deposited.

After that, the fixed substrate 51 and the movable substrate 52 are joined together via the joining film 53, thus providing the variable-wavelength interference filter 5.

Next, the FPC 615A is connected to the fixed electrode pad 563P and the movable electrode pad 564P of the resulting variable-wavelength interference filter 5. To connect the FPC 615A and each electrode pad 563P, 564P, for example, Ag paste, ACF (anisotropic conductive film), ACP (anisotropic conductive paste) or the like is used for joining. In the case of maintaining the internal space 650 in a vacuum state, it is preferable to use Ag paste that has little outgassing.

Base Substrate Preparation Process

In the base substrate preparation process, first, a base outer shape is formed. A substrate before burning, formed by stacking sheets as forming materials of a ceramic substrate, is properly cut and the shape of the base substrate 610 having the light transmission hole 611 is formed. Here, the light transmission hole 611 is formed at such a position that the outer peripheral edge of the light transmission hole 611 faces the holding portion 522 of the movable substrate 52 as described above. Then, the substrate before burning is burned to form the base substrate 610.

The light transmission hole 611 may be formed in the burned base substrate 610 by processing using a high-output laser, for example, YAG laser or the like.

Next, the through-hole 614 is formed in the base substrate 610. In order to form a fine through-hole 614, laser processing using, for example, YAG laser or the like, is carried out. Also, the resulting through-hole 614 is filled with a conductive member with high contactability.

After that, the inner terminal portion 615 and the outer terminal portion 616 are formed on the base substrate 610.

For example, plating with a metal such as Ni/Au is carried out to form the inner terminal portion 615 and the outer terminal portion 616. Also, in the case of laser-welding the base joining portion 617 and the lid joining portion 624 together by brazing, the base joining portion 617 is plated with Ni or the like to form the joining pattern 617A.

After that, the base-side glass substrate 630 for covering the light transmission hole 611 is joined to the base substrate 610. As a method for joining the base-side glass substrate 630, for example, glass frit bonding using glass frit that is a glass pieces formed by melting a glass material at a high temperature and then quickly cooling the melted glass material, welding with a low-melting glass, bonding with an epoxy resin or the like may be used.

Lid Preparation Process

In the lid preparation process, first, the lid 620 is formed. A metal substrate made of Kovar or the like is press-worked to form the lid 620 having the light transmission hole 621.

After that, the lid-side glass substrate 640 for covering the light transmission hole 621 is joined to the lid 620. As a method for joining the lid-side glass substrate 640, for example, glass frit bonding using glass frit that is a glass pieces formed by melting a glass material at a high temperature and then quickly cooling the melted glass material, welding with a low-melting glass, bonding with an epoxy resin or the like may be used.

Device Assembling Process

Next, a device assembling process to join together the variable-wavelength interference filter 5, the base substrate 610 and the lid 620 thus obtained, to form the optical filter device 600, is carried out.

In the device assembling process, first, the variable-wavelength interference filter 5 is fixed to the base substrate 610. Alignment adjustment is carried out so that the plan center point O of the fixed reflection film 54 and the movable reflection film 55 coincides with the plan center point O of the light transmission hole 611 and so that the outer peripheral edge of the light transmission hole 611 of the base substrate 610 faces the holding portion 522 of the movable substrate 52 of the variable-wavelength interference filter 5. Then, the substrate outer peripheral portion 525 of the movable substrate 52 is adhered and fixed to the base substrate 610, for example, using an adhesive or the like.

Then, wires are connected. The other end of the FPC 615A connected to the variable-wavelength interference filter 5 in the filter preparation process is bonded to the inner terminal portion 615 on the base substrate 610. Thus, the inner terminal portion 615, and the fixed electrode pad 563P and the movable electrode pad 564P are connected to each other. Also in this connection, it is preferable to use Ag paste that has little degassing.

After that, the base substrate 610 and the lid 620 are joined together. For example, the base substrate 610 and the lid 620 are superimposed on each other in an environment that is set into a vacuum atmosphere, for example, in a vacuum chamber device or the like, and the base substrate 610 and the lid 620 are joined together, for example, by laser bonding using YAG laser or the like. In such laser bonding, only the joining portion is locally heated to a high temperature and joined. Therefore, temperature rise in the internal space 650 can be restrained. Thus, the inconvenience of deterioration of the reflection films 54, 55 of the variable-wavelength interference filter 5 due to high temperature can be prevented.

Through the above processes, the optical filter device 600 is manufactured.

Effects and Advantages of Embodiment

In this embodiment, the optical filter device 600 has the variable-wavelength interference filter 5 and the casing 601.

The variable-wavelength interference filter 5 has the fixed substrate 51, the movable substrate 52 joined to the fixed substrate 51, the fixed reflection film provided on the fixed substrate 51, the movable reflection film provided on the movable substrate 52, and the gap change unit that changes the gap dimension between the reflection films. The casing 601 has the base substrate 610 and the lid 620 forming the internal space with the base substrate 610. The movable substrate 52 has the holding portion 522 provided on the surface opposite to the fixed substrate 51, outside the light interference region, as viewed in a plan view. The base substrate 610 has the light transmission hole 611 corresponding to the light transmission region. The outer peripheral edge of the light transmission hole 611 faces the holding portion 522. The surface opposite to the fixed substrate 51 of the movable substrate 52 is joined to the base substrate 610.

In such a configuration, for example, even if the base substrate 610 with impaired parallelism due to the generation of a curvature, protrusion or the like near the outer peripheral edge of the light transmission hole 611 is joined to the variable-wave length interference filter 5, the periphery of the outer peripheral edge of the light transmission hole 611 faces the holding portion 522 and therefore local contact of the curving portion or protruding portion with the joining surface of the variable-wavelength interference filter 5 can be avoided. Thus, the variable-wavelength interference filter 5 can be joined horizontally to the base substrate 610 and high spectroscopic accuracy can be realized.

In this embodiment, the movable substrate 52 is installed on the base substrate 610 via the adhesive layer 610A. In such a configuration, a spacing corresponding to the thickness of the adhesive layer 610A is generated between the base substrate 610 and the movable substrate 52. Therefore, a stress based on the shape of the base substrate 610 is not transmitted to the movable substrate 52.

Second Embodiment

Next, a second embodiment of the invention will be described with reference to the drawings.

In the second embodiment, a color measurement sensor 3 as an optical module in which the optical filter device 600 of the first embodiment is incorporated, and a color measurement device 1 as an electronic apparatus in which the optical filter device 600 is incorporated, will be described.

1. Schematic Configuration of Color Measurement Device

Figure 5:
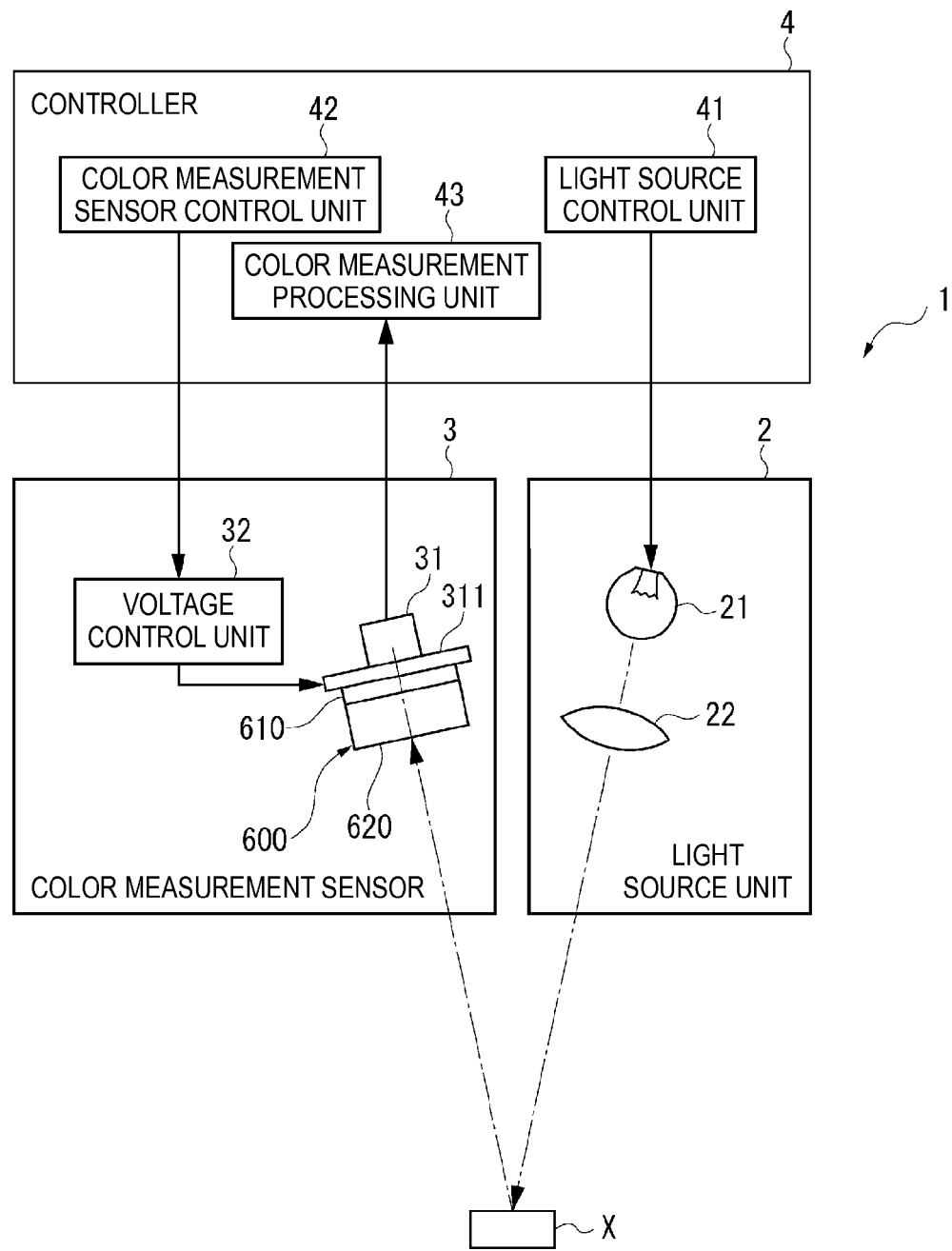
FIG. 5 is a block diagram showing the schematic configuration of a color measurement device according to a second embodiment.

FIG. 5 is a block diagram showing the schematic configuration of the color measurement device 1 according to the second embodiment.

The color measurement device 1 is an electronic apparatus according to the invention. The color measurement device 1 has a light source unit 2 that emits light to an inspection target X, a color measurement sensor 3, and a controller 4 that controls the overall operation of the color measurement device 1, as shown in FIG. 5. The color measurement device 1 is a device in which light emitted from the light source unit 2 is reflected by the inspection target X, then the reflected inspection target light is received by the color measurement sensor 3, and based on a detection signal outputted from the color measurement sensor 3, the chromaticity of the inspection target light, that is, the color of the inspection target X, is analyzed and measured.

2. Configuration of Light Source Unit

The light source unit 2 has a light source 21 and plural lenses 22 (in FIG. 5, only one lens is shown), and emits white light to the inspection target X. The plural lenses 22 may include a collimating lens, and in such a case, the light source unit 2 causes the collimating lens to collimate the white light emitted from the light source 21 and emits the collimated light toward the inspection target X from a projection lens, not shown. While the color measurement device 1 having the light source unit 2 is described as an example in this embodiment, a configuration without having the light source unit 2 may be used, for example, if the inspection target X is a light emitting member such as a liquid crystal panel.

3. Configuration of Color Measurement Sensor

The color measurement sensor 3 constitutes the optical module according to the invention and has the optical filter device 600 of the first embodiment. The color measurement sensor 3 has the optical filter device 600, a detection unit 31 that receives light transmitted through the variable-wavelength interference filter 5 of the optical filter device 600, and a voltage control unit 32 that varies the wavelength of the light transmitted through the variable-wavelength interference filter 5, as shown in FIG. 5.

The color measurement sensor 3 also has an incident optical lens, not shown, that guides inside the reflected light (inspection target light) reflected by the inspection target X, at a position facing the variable-wavelength interference filter 5. The color measurement sensor 3 spectroscopically splits light with a predetermined wavelength, of the inspection target light incident from the incident optical lens, using the variable-wavelength interference filter 5 in the optical filter device 600, and receives the spectroscopically split light at the detection unit 31.

The detection unit 31 is formed by plural photoelectric conversion elements and generates an electrical signal corresponding to the amount of light received. Here, the detection unit 31 is connected to the controller 4, for example, via a circuit board 311, and outputs the resulting electrical signal to the controller 4 as a light receiving signal.

The outer terminal portion 616 formed on the base outer surface 613 of the base substrate 610 is connected to the circuit board 311 and is thus connected to the voltage control unit 32 via a circuit formed on the circuit board 311.

In such a configuration, the optical filter device 600 and the detection unit 31 can be integrally formed via the circuit board 311 and the configuration of the color measurement sensor 3 can be simplified.

The voltage control unit 32 is connected to the outer terminal portion 616 of the optical filter device 600 via the circuit board 311. The voltage control unit 32 applies a predetermined step voltage between the fixed electrode pad 563P and the movable electrode pad 564P, based on a control signal inputted from the controller 4, and thereby drives the electrostatic actuator 56. Thus, an electrostatic attraction is generated in the inter-electrode gap G2 and the holding portion 522 flexes, causing the movable portion 521 to be displaced toward the fixed substrate 51. Thus, it is possible to set the inter-reflection film gap G1 to a desired dimension.

4. Configuration of Controller

The controller 4 controls the overall operation of the color measurement device 1.

As the controller 4, for example, a general-purpose computer, portable information terminal, or dedicated computer for color measurement or the like can be used.

The controller 4 includes alight source control unit 41, a color measurement sensor control unit 42, and a color measurement processing unit 43 or the like, as shown in FIG. 5.

The light source control unit 41 is connected to the light source unit 2. The light source control unit 41 outputs a predetermined control signal to the light source unit 2, for example, based on the user's setting input, and causes the light source unit 2 to emit white light with predetermined brightness.

The color measurement sensor control unit 42 is connected to the color measurement sensor 3. The color measurement sensor control unit 42 sets the wavelength of light to be received by the color measurement sensor 3, for example, based on the user's setting input, and outputs a control signal to detect the amount of light received with this wavelength to the color measurement sensor 3. Thus, based on the control signal, the voltage control unit 32 of the color measurement sensor 3 sets a voltage to be applied to the electrostatic actuator 56 so that only the wavelength of light desired by the user is transmitted.

The color measurement processing unit 43 analyzes the chromaticity of the inspection target X based on the amount of light received that is detected by the detection unit 31.

5. Effects and Advantages of Embodiment

The color measurement device 1 of this embodiment has the optical filter device 600 as described in the first embodiment. As described above, in the optical filter device 600, the variable-wavelength interference filter 5 can be joined horizontally to the base substrate 610 and high spectroscopic accuracy can be realized. Thus, in the color measurement sensor 3, too, light with a target wavelength taken out with high resolution can be detected by the detection unit 31 and an accurate amount of light can be detected with respect to light with a desired target wavelength. Therefore, the color measurement device 1 can carry out accurate color analysis of the inspection target X.

The detection unit 31 is provided facing the base substrate 610. The detection unit 31 and the outer terminal portion 616 provided on the base outer surface 613 of the base substrate 610 are connected to the single circuit board 311. That is, the base substrate 610 of the optical filter device 600 is arranged on the light exiting side and therefore can be arranged closely to the detection unit 31 that detects light emitted from the optical filter device 600. Therefore, laying wires on the single circuit board 311 as described above enables simplification of the wiring structure and reduction in the number of substrates.

The voltage control unit 32 may be arranged on the circuit board 311. In such a case, the configuration can be simplified further.

Other Embodiments

The invention is not limited to the foregoing embodiments. Modifications, improvements and the like within the range in which the object of the invention can be achieved are included in the invention.

Figure 6:
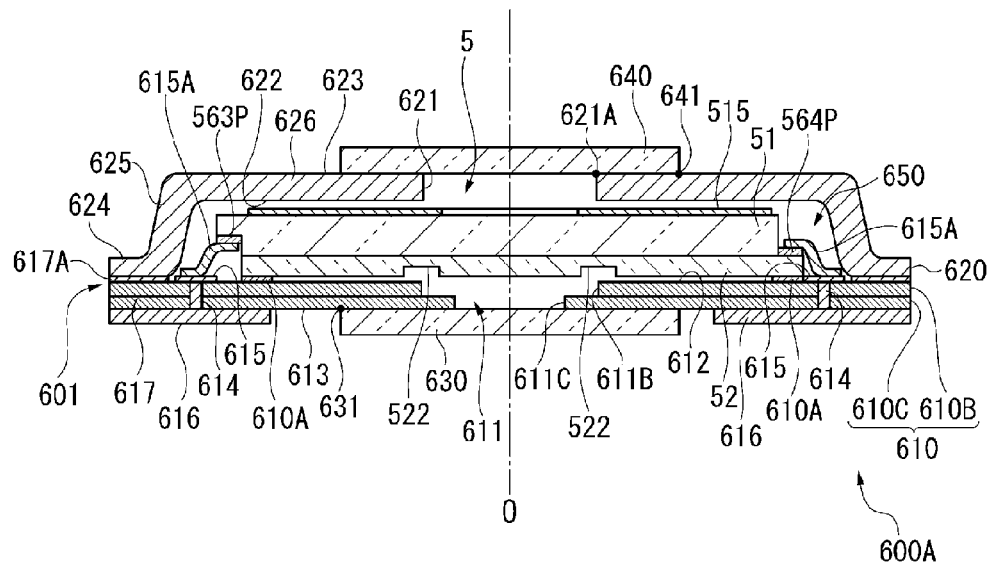
FIG. 6 is a sectional view showing the schematic configuration of an optical filter device according to a modification.

FIG. 6 is a sectional view showing an optical filter device according to a modification.

As shown in FIG. 6, this optical filter device 600A is configured in such a way that the light transmission hole 611 of the base substrate 610 is different in size on the surface side facing the movable substrate 52 and the surface side opposite to the movable substrate 52. An outer peripheral edge 611B on the surface side facing the movable substrate 52 of the light transmission hole 611 faces the holding portion 522. The holding portion 522 is situated on the outer side of an outer peripheral edge 611C on the surface side opposite to the movable substrate 52 of the light transmission hole 611, as viewed in a plan view.

The base substrate 610 with the above structure can be formed by a multilayer structure in which two substrates having light transmission holes with different diameter sizes from each other are stacked. Specifically, the diameter of the light transmission hole 611 in a base forming first substrate 610 on the surface side facing the movable substrate 52 is dimensioned in such a way that the outer peripheral edge 611B thereof faces the holding portion 522. Then, the diameter of the light transmission hole 611 in a base forming second substrate 610C on the surface side opposite to the movable substrate 52 is dimensioned in such a way that the holding portion 522 is situated on the outer side of the outer peripheral edge 611C thereof, as viewed in a plan view.

In the first embodiment, the outer peripheral edge of the light transmission hole 611 of the base substrate 610 and the holding portion 522 of the movable substrate 52 face each other. However, when light becomes incident on a device with such a configuration, the light may become stray light, which exits through the light transmission hole 611. This is because, as the holding portion 522 is formed by processing such as etching, a curve surface is formed at the boundary between the holding portion 522 and the movable portion 521, causing diffused reflection when light becomes incident on the curved surface.

Meanwhile, in the present embodiment, the outer peripheral edge 611C on the surface side opposite to the movable substrate 52 is arranged in such a way that the holding portion 522 is situated on the outer side, in consideration of stray light. Therefore, even when light becomes incident on the device, the light does not enter the holding portion 522. Thus, the generation of stray light due to the incidence of light on the holding portion 522 can be prevented and light with a desired target wavelength can be taken out.

Figure 7:
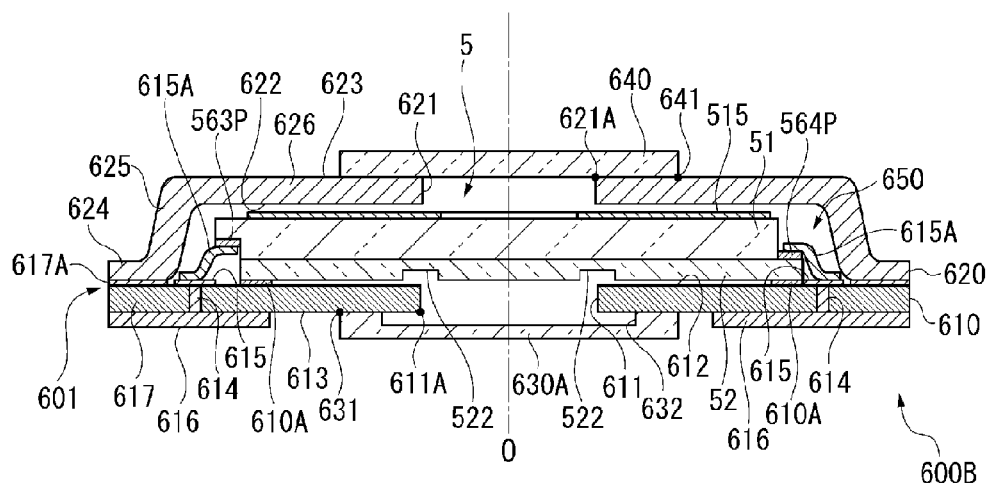
FIG. 7 is a sectional view showing the schematic configuration of an optical filter device according to a modification.

FIG. 7 is a sectional view showing an optical filter device according to another modification.

As shown in FIG. 7, in this optical filter device 600B, a base-side glass substrate 630A has a larger recessed portion 632 than the light transmission hole 611 provided on a surface jointed to the base substrate 610. The recessed portion 632 is formed in such a way that the outer peripheral edge of the light transmission hole 611 is situated therein.

In such an optical filter device 600B, even if parallelism of the base substrate 610 is not maintained, for example, if a curvature, protrusion or the like is generated on the outer peripheral edge of the light transmission hole 611, the recessed portion 632 provided on the base-side glass substrate 630A can prevent local contact with the curving portion or protruding portion. Therefore, the base-side glass substrate 630A can be joined horizontally to the base substrate 610, and the base-side glass substrate 630A and the variable-wavelength interference filter 5 become parallel to each other.

Also, in the embodiment, the base-side glass substrate 630A may be joined to the base substrate 610 via a spacer. In such a configuration, for example, even if parallelism of the base substrate 610 is impaired and a curving portion or protruding portion locally contacts the recessed portion 632 on the base-side glass substrate 630A, height adjustment with the spacer enables prevention of the local contact.

In the first embodiment, the optical filter device 600 that houses the variable-wavelength interference filter 5 in which the size of the inter-reflection film gap G1 can be changed by an electrostatic attraction generated by application of a voltage to the fixed electrode 561 and the movable electrode 562 is described as an example. However, possible configurations of the optical filter device are not limited to this example. For example, as a gap changing unit to change the inter-reflection film gap G1, a dielectric actuator in which a first dielectric coil is arranged instead of the fixed electrode 561 whereas a second dielectric coil or permanent magnet is arranged instead of the movable electrode 562 may be used.

Moreover, a piezoelectric actuator may be used instead of the electrostatic actuator 56. In this case, for example, by stacking a lower electrode layer, a piezoelectric film and an upper electrode layer on the holding portion 522 and varying a voltage applied between the lower electrode layer and the upper electrode layer as an input value, the piezoelectric film can be expanded or contracted to flex the holding portion 522.

The lid 620 having the lid joining portion 624, the sidewall portion 625 and the top portion 626 and configured in such a way that the top portion 626 is parallel to the base substrate 610, is described. However, possible configurations of the lid are not limited to this example. The shape of the lid 620 may be any shape as long as the internal space 650 capable of housing the variable-wavelength interference filter 5 can be formed between the lid 620 and the base substrate 610. For example, the top portion 626 may be in the form of a curved surface. However, in this case, the manufacturing thereof is expected to be more complex, for example, as the lid-side glass substrate 640 joined to the lid 620 needs to be curved following the lid 620 in order to maintain airtightness of the internal space 650 and only the portion closing the light transmission hole 621 must be made flat in order to prevent refraction, and the like. Therefore, it is preferable that the lid 620 having the top portion 626 parallel to the base substrate 610 is used, as in the first embodiment.

In the first embodiment, the configuration in which the inner terminal portion 615 and the outer terminal portion 616 are connected via a conductive member in the through-hole 614 provided in the base substrate 610 is described as an example. However, possible configurations for connection are not limited to this example. For example, a bar-shaped terminal may be pressed into the through-hole 614 in the base substrate 610 and a distal end of the terminal may be connected to toe fixed electrode pad 563P, the movable electrode pad 564P and the like.

In the first embodiment, the fixed electrode 561 and the movable electrode 562 forming the electrostatic actuator (and the electrode pads 563P, 564P connected to the electrodes 561, 562) are described as an example of electrode portions according to the invention provided in the variable-wavelength interference filter 5. However, possible configurations of electrodes are not limited to this example.

Another example of electrodes may be an electrostatic capacitance detection electrode for measuring the size of the inter-reflection film gap G1 based on change in the amount of electric charge held in the fixed reflection film 54 and the movable reflection film 55, or a charge removable electrode for releasing electric charge held in the substrates 51, 52, the fixed reflection film 54 and the movable reflection film 55 and removing a Coulomb force between the substrates.

In the first embodiment, the non-light-transmissive member 515 is provided on the light incident surface of the fixed substrate 51. However, for example, the non-light-transmissive member 515 may be provided on the lid-side glass substrate 640 on the incident side, or the like.

Also, while the optical filter device 600 in which light incident from the lid 620 side is subject to multiple interference by the variable-wavelength interference filter 5 and then the light transmitted through the variable-wavelength interference filter 5 is made to exit from the base-side glass substrate 630 is described as an example in the first embodiment, light may be made incident, for example, from the base substrate 610 side. In this case, a non-light-transmissive member functioning as an aperture may be provided on the movable substrate 52. Alternatively, the fixed substrate 51 provided with a non-light-transmissive member may be fixed to the base substrate 610.

Also, while the color measurement device 1 is described in the second embodiment as an example of the electronic apparatus according to the invention, the optical filter device, the optical module and the electronic apparatus according to the invention can be used in various other fields.

For example, the invention can be used for an optical base system for detecting the presence of a specific substance. Such a system can be, for example, a gas detection device such as an on-vehicle gas leakage detector that detects a specific gas with high sensitivity by employing a spectroscopic measurement method using the variable-wavelength interference filter according to the invention, or a photoacoustic rare gas detector for breath test.

An example of such a gas detection device will be described below with reference to the drawings.

Figure 8:
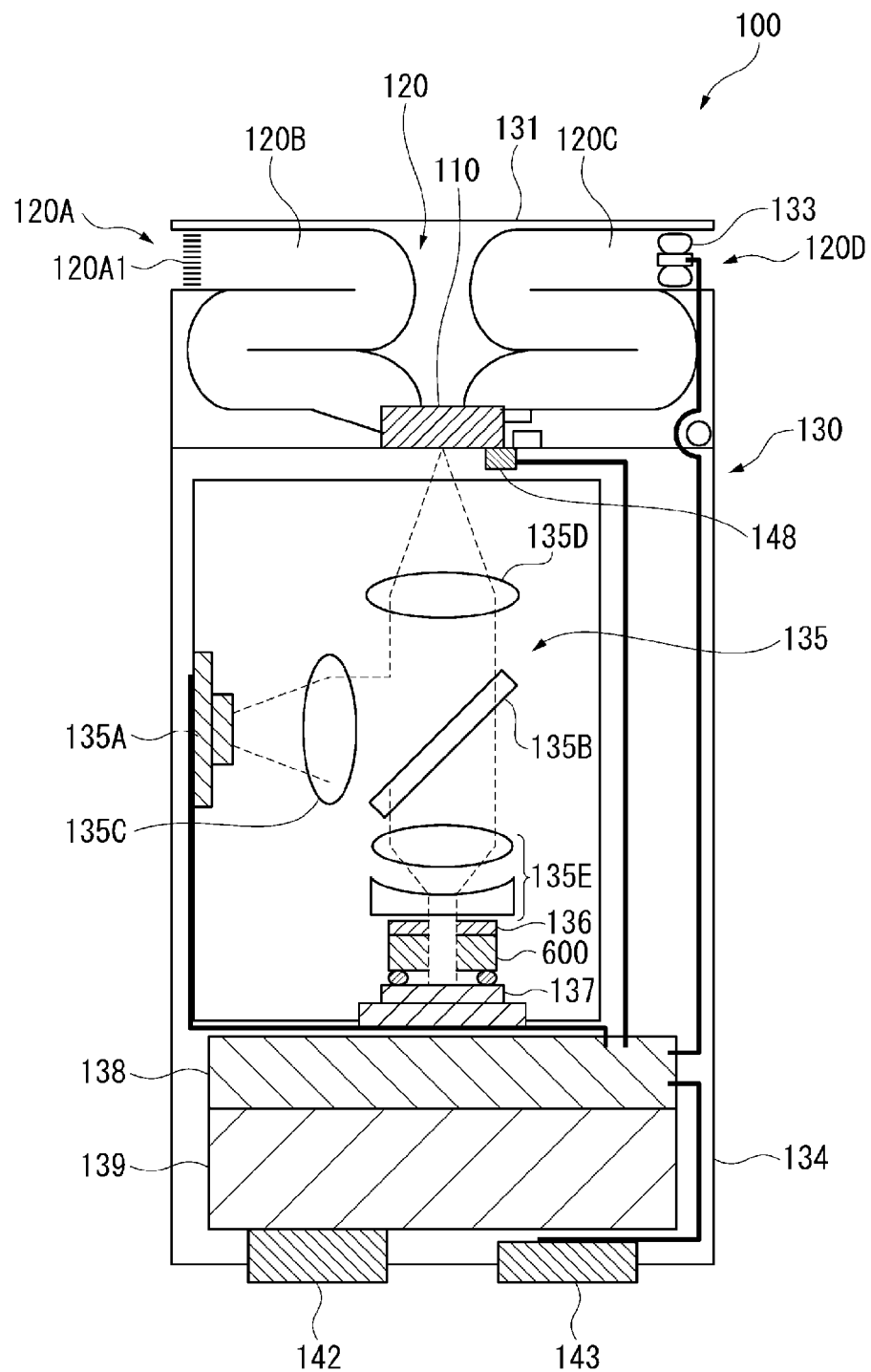
FIG. 8 is a schematic view showing a gas detection device having an optical filter device according to the invention.

FIG. 8 is a schematic view showing an example of a gas detection device having a variable-wavelength interference filter.

Figure 9:
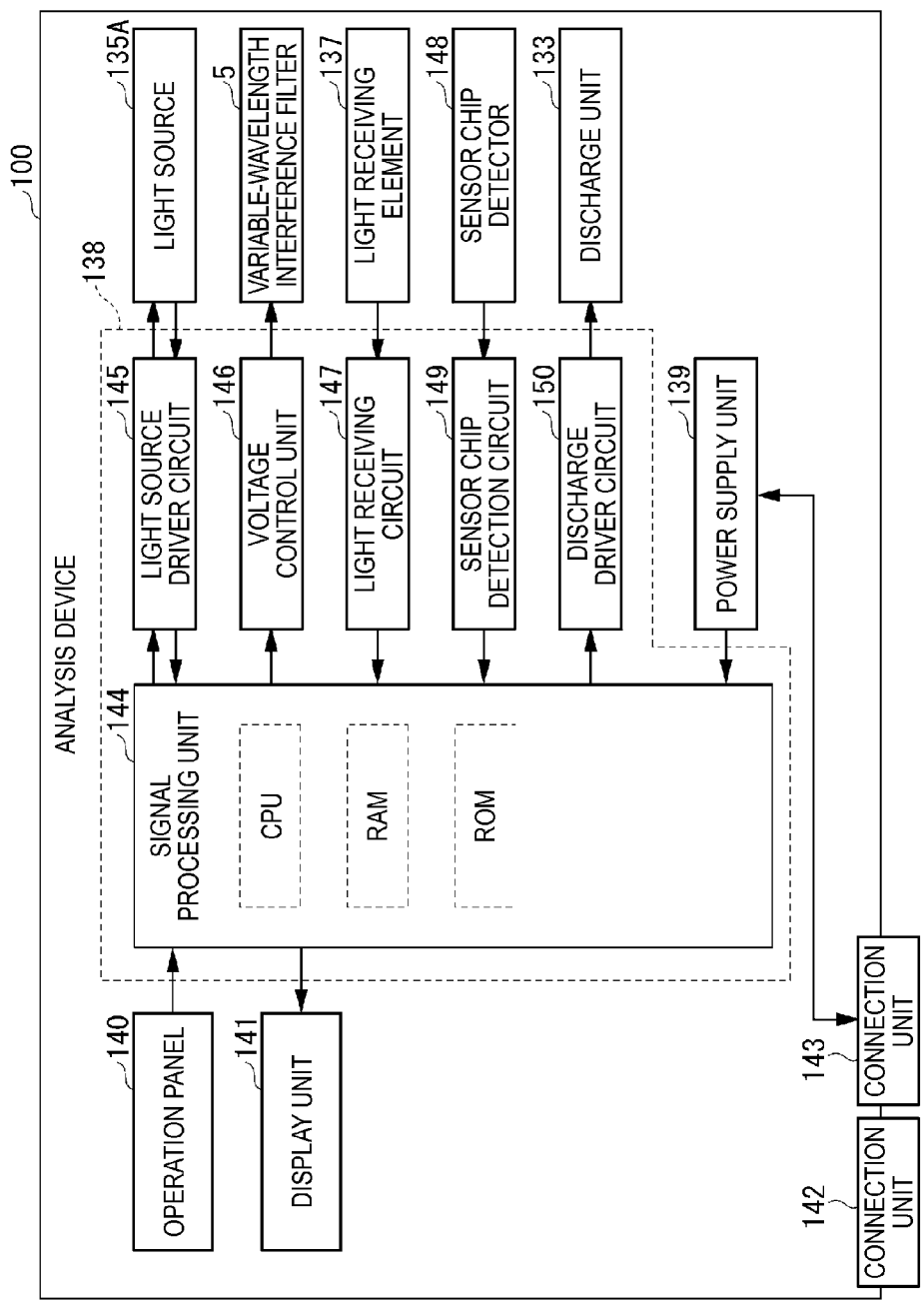
FIG. 9 is a block diagram showing the configuration of a control system of the gas detection device of FIG. 8.

FIG. 9 is a block diagram showing the configuration of a control system of the gas detection device of FIG. 8.

This gas detection device 100 has a sensor chip 110, a flow path 120 including a suction port 120A, a suction flow path 120B, a discharge flow path 120C and a discharge port 120D, and a main body unit 130, as shown in FIG. 8.

The main body unit 130 is formed by a detection device including a sensor unit cover 131 having an opening that the flow path 120 can be attached to and removed from, a discharge unit 133, a casing 134, an optical unit 135, a filter 136, an optical filter device 600 and a light receiving element 137 (detection unit) or the like; a control unit 138 that processes a detected signal and controls the detection unit; and a power supply unit 139 that supplies electric power, and the like. The optical unit 135 includes a light source 135A that emits light, a beam splitter 135B that reflects light incident from the light source 135A toward the sensor chip 110 and transmits light incident from the sensor chip side toward the light receiving element 137, and lenses 135C, 135D, 135E.

As shown in FIG. 9, an operation panel 140, a display unit 141, a connection unit 142 for interfacing with the outside, and the power supply unit 139 are provided on the surface of the gas detection device 100. If the power supply unit 139 is a secondary battery, a connection unit 143 for charging may be provided.

Moreover, the control unit 138 of the gas detection device 100 has a signal processing unit 144 made up of a CPU or the like, a light source driver circuit 145 for controlling the light source 135A, a voltage control unit 146 for controlling the variable-wavelength interference filter 5 of the optical filter device 600, a light receiving circuit 147 that receives a signal from the light receiving element 137, a sensor chip detection circuit 149 receiving a signal from a sensor chip detector 148 that reads a code of the sensor chip 110 and detects the presence or absence of the sensor chip 110, and a discharge driver circuit 150 that controls the discharge unit 133, as shown in FIG. 9.

Next, the operation of the gas detection device 100 as described above will be described hereinafter.

The sensor chip detector 148 is provided inside the sensor unit cover 131 at the top of the main body unit 130. The sensor chip detector 148 detects the presence or absence of the sensor chip 110. As the signal processing unit 144 detects a detection signal from the sensor chip detector 148, the signal processing unit 144 determines that the sensor chip 110 is installed, and sends a display signal to display that a detection operation is available, to the display unit 141.

Then, for example, when the user operates the operation panel 140 and an instruction signal to start detection processing is outputted from the operation panel 140 to the signal processing unit 144, first, the signal processing unit 144 outputs a light source actuation signal to the light source driver circuit 145 and thus actuates the light source 135A. As the light source 135A is driven, a stable laser beam of linearly polarized light with a single wavelength is emitted from the light source 135A. Also, since a temperature sensor and a light amount sensor are arranged inside the light source 135A, information from these sensors is outputted to the signal processing unit 144. If the signal processing unit 144 determines that the light source 135A is in stable operation, based on the temperature and the amount of light inputted from the light source 135A, the signal processing unit 144 controls the discharge driver circuit 150 to actuate the discharge unit 133. Thus, a gas sample containing a target substance (gas molecules) to be detected is guided from the suction port 120A to the suction flow path 120B, inside the sensor chip 110, the discharge flow path 120C, and the discharge port 120D. A dust filter 120A1 is provided in the suction port 120A, and relatively large dust particles, a part of water vapor and the like are eliminated.

The sensor chip 110 is a sensor which has plural metal nanostructures incorporated therein and utilizes local surface plasmon resonance. In such a sensor chip 110, an enhanced electric field is formed between the metal nanostructures by a laser beam, and if a gas molecule enters this enhanced electric field, Raman-scattered light and Rayleigh-scattered light including information of molecular vibration are generated.

Such Rayleigh-scattered light and Raman-scattered light pass through the optical unit 135 and become incident on the filter 136. The Rayleigh-scattered light is separated by the filter 136, and the Raman-scattered light becomes incident on the optical filter device 600. The signal processing unit 144 controls the voltage control unit 146 to adjust the voltage applied to the variable-wavelength interference filter 5 of the optical filter device 600, and thus causes the variable-wavelength interference filter 5 of the optical filter device 600 to spectroscopically split the Raman-scattered light corresponding to the detection target gas molecule. After that, when the spectroscopically split light is received by the light receiving element 137, a light receiving signal corresponding to the amount of light received is outputted to the signal processing unit 144 via the light receiving circuit 147.

The signal processing unit 144 compares the spectrum data of the Raman-scattered light corresponding to the detection target gas molecule, thus obtained, with data stored in a ROM, then determines whether the gas molecule is the target gas molecule or not, and specifies the substance. The signal processing unit 144 also causes the display unit 141 to display information of the result thereof and outputs the information of the result to outside from the connection unit 142.

In FIGS. 8 and 9, the gas detection device 100 that causes the variable-wavelength interference filter 5 of the optical filter device 600 to spectroscopically split Raman-scattered light and detects a gas from the spectroscopically split Raman-scattered light, is described as an example. However, a gas detection device that detects a gas-specific degree of light absorption and thus specifies a gas type may be used. In such a case, a gas sensor that causes a gas to flow into the sensor and detects light absorbed in the gas, of incident light, is used as an optical module according to the invention. A gas detection device that analyzes and determines the gas flowing into the sensor, using such a gas sensor, is considered as an electronic apparatus according to the invention. With this configuration, too, components of the gas can be detected using the variable-wavelength interference filter.

Also, as a system for detecting the presence or absence of a specific substance, substance component analysis devices such as a non-invasive saccharide measurement device using near infrared spectroscopy and a non-invasive measurement device for information about food, living body, minerals and the like can be given as examples, other than the above gas detection device.

Hereinafter, a food analysis device will be described as an example of the above substance component analysis device.

Figure 10:
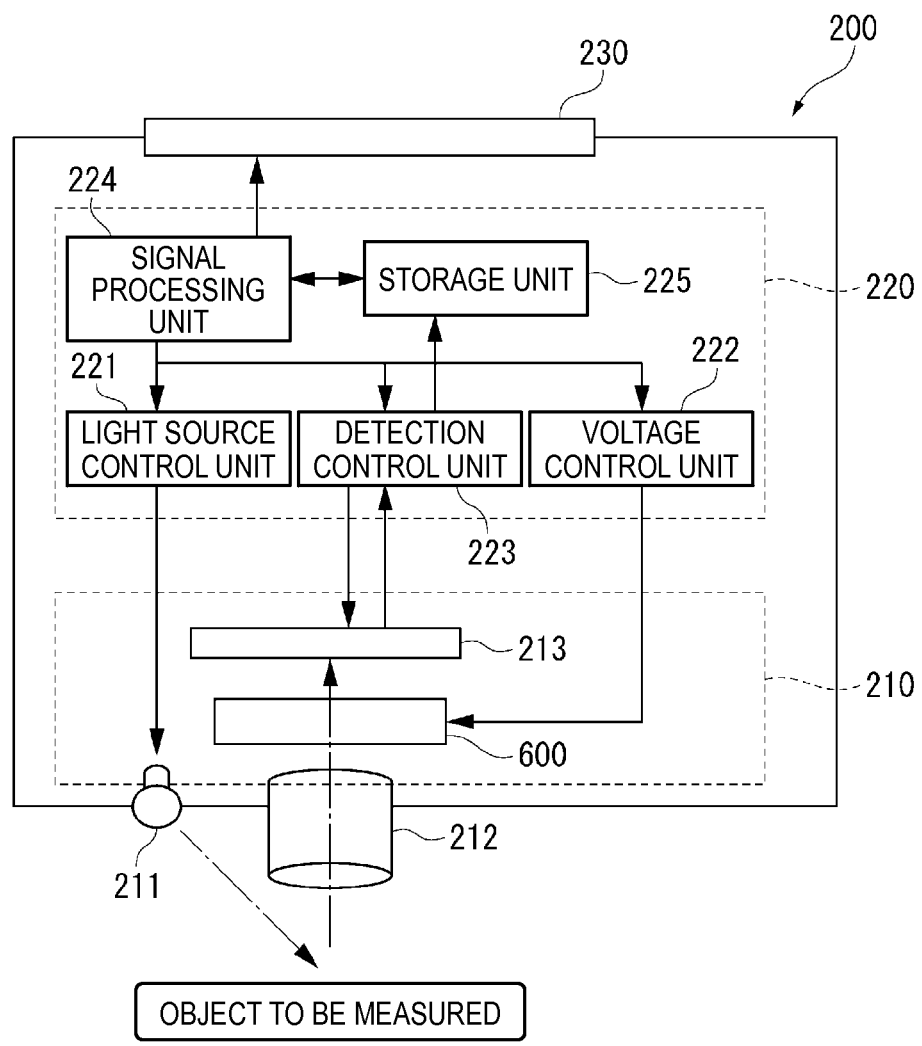
FIG. 10 shows the schematic configuration of a food analyzer having an optical filter device according to the invention.

FIG. 10 shows the schematic configuration of a food analysis device as an example of an electronic apparatus using the optical filter device 600.

This food analysis device 200 has a detector 210 (optical module), a control unit 220, and a display unit 230, as shown in FIG. 10. The detector 210 has a light source 211 that emits light, an image pickup lens 212 to which light from an object to be measured is introduced, the optical filter device 600 that spectroscopically splits the light introduced from the image pickup lens 212, and a image pickup unit 213 (detection unit) that detects the spectroscopically split light.

The control unit 220 has a light source control unit 221 that controls switching on and off of the light source 211 and controls brightness thereof when the light source 211 is on, a voltage control unit 222 that controls the variable-wavelength interference filter 5 of the optical filter device 600, a detection control unit 223 that controls the image pickup unit 213 and acquires a spectroscopic image picked up by the image pickup unit 213, a signal processing unit 224, and a storage unit 225.

In this food analysis device 200, when the system is driven, the light source 211 is controlled by the light source control unit 221 and light is cast from the light source 211 onto the object to be measured. Then, the light reflected by the object to be measured passes through the image pickup lens 212 and becomes incident on the optical filter device 600. A voltage that enables spectroscopic splitting of a desired wavelength is applied to the variable-wavelength interference filter 5 of the optical filter device 600 under the control of the voltage control unit 222. The spectroscopically split light is picked up by the image pickup unit 213 formed, for example, by a CCD camera or the like. The picked-up light is stored as a spectroscopic image in the storage unit 225. The signal processing unit 224 controls the voltage control unit 222 to change the voltage value applied to the variable-wavelength interference filter 5, and acquires a spectroscopic image corresponding to each wavelength.

The signal processing unit 224 carries out arithmetic processing of data of each pixel in each image stored in the storage unit 225 and thus finds the spectrum at each pixel.

In the storage unit 225, for example, information about ingredients of food corresponding to the spectrum is stored. The signal processing unit 224 analyzes the resulting spectrum data, based on the information about food stored in the storage unit 225, and finds food ingredients contained in the detection target and the amount of the ingredients contained. The calories, freshness and the like of the food can also be calculated, based on the resulting food ingredients and the amount of the ingredients contained. Moreover, by analyzing the spectral distribution in the image, extraction of a part where freshness is lowered in the inspection target food or the like can be carried out. Also, foreign matters or the like contained in the food can be detected.

Then, the signal processing unit 224 carries out processing to cause the display unit 230 to display information about the ingredients of the inspection target food, the amount of the ingredients contained, the calories and freshness and the like, acquired as described above.

While FIG. 10 shows the food analysis device 200 as an example, a non-invasive measurement device for other types of information as described above, having a substantially similar configuration, can also be used. A similar configuration can be used, for example, as a bioanalysis device that analyzes components of a living body, for example, by measuring and analyzing components of body fluids such as blood. If a device that detects ethyl alcohol is used as such a bioanalysis device, for example, as a device that measures components of body fluids such as blood, the device can be used as a drunk driving prevention device that detects the drunk state of the driver. Also, an electronic endoscope system having such a bioanalysis device can be used.

Moreover, a similar configuration can be used as a mineral analysis device that analyzes components of minerals.

Furthermore, the variable-wavelength interference filter, the optical module and the electronic apparatus according to the invention can be applied to the following devices.

For example, by changing the intensity of light of each wavelength with time, it is possible to transmit data on the light of each wavelength. In this case, light of a specific wavelength is spectroscopically split by the variable-wavelength interference filter provided in the optical module and then received by a light receiving unit. Thus, data transmitted on the light of the specific wavelength can be extracted. By processing the data of light of each wavelength using an electronic apparatus having such an optical module for data extraction, it is possible to carry out optical communication.

The electronic apparatus can also be applied to a spectroscopic camera, spectroscopic analyzer or the like that spectroscopically splits light by the variable-wavelength interference filter according to the invention, and thus picks up a spectroscopic image. An example of such a spectroscopic camera may be an infrared camera having a built-in variable-wavelength interference filter.

Figure 11:
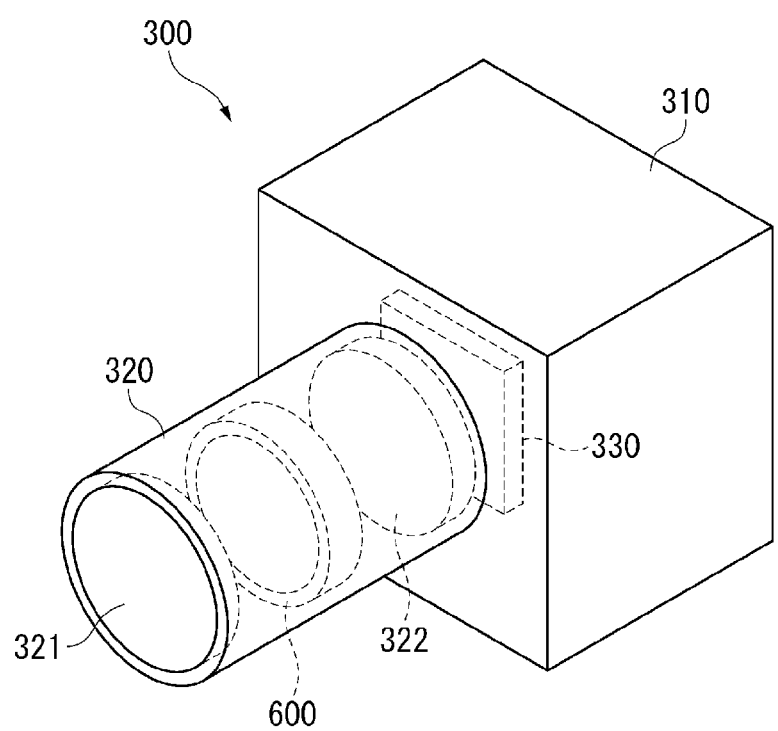
FIG. 11 is a schematic diagram showing the schematic configuration of a spectroscopic camera having an optical filter device according to the invention.

FIG. 11 is a schematic view showing the schematic configuration of a spectroscopic camera. A spectroscopic camera 300 has a camera main body 310, an image pickup lens unit 320, and an image pickup unit 330 (detection unit), as shown in FIG. 11.

The camera main body 310 is apart that the user holds and operates.

The image pickup lens unit 320 is provided on the camera main body 310 and guides incident image light to the image pickup unit 330. The image pickup lens unit 320 has an objective lens 321, an imaging lens 322, and the optical filter device 600 provided between these lenses, as shown in FIG. 11.

The image pickup unit 330 includes a light receiving element and picks up the image light guided by the image pickup lens unit 320.

In such a spectroscopic camera 300, light of an image pickup target wavelength is transmitted through the variable-wavelength interference filter 5 of the optical filter device 600, thus enabling a spectroscopic image of light of a desired wavelength to be picked up.

Moreover, the variable-wavelength interference filter according to the invention may be used as a band-pass filter. For example, the variable-wavelength interference filter can be used for an optical laser device that spectroscopically splits and transmits, by the variable-wavelength interference filter, only light in a narrow range around a predetermined wavelength, of light in a predetermined wavelength range emitted from a light emitting element.

Also, the variable-wavelength interference filter according to the invention may be used for a biometrics authentication device. For example, the variable-wavelength interference filter can be applied to an authentication device for blood vessel, fingerprint, retina, iris or the like, using light in a near infrared range or visible range.

Moreover, the optical module and the electronic apparatus can be used as a concentration detection device. In this case, infrared energy (infrared ray) emitted from a substance is spectroscopically split and analyzed by the variable-wavelength interference filter, thus measuring the concentration of a detection target in a sample.

As described above, the variable-wavelength interference filter, the optical module, and the electronic apparatus according to the invention can be applied to any device that spectroscopically splits predetermined light from incident light. Since the variable-wavelength interference filter according to the invention can spectroscopically split plural wavelengths by the single device, as described above, measurement of the spectrum of plural wavelengths and detection of plural components can be carried out accurately. Therefore, compared with a traditional device that takes out a desired wavelength by plural devices, miniaturization of the optical module and the electronic apparatus can be promoted, and the device can be suitably used, for example, as a portable or on-vehicle optical device.

The specific structures to carry out the invention can be suitably changed to other structures within a range that can achieve the object of the invention.

The entire disclosure of Japanese Patent Application No. 2013-020163 filed on Feb. 5, 2013 is expressly incorporated by reference herein.

What is claimed is:
1. An optical filter device comprising:
   a light interference filter having a first substrate, a second substrate facing the first substrate, a first reflection film provided on the first substrate, and a second reflection film provided on the second substrate and facing the first reflection film; and
   a casing having a base substrate that fixes the light interference filter, and a lid that is joined to the base substrate and forms an internal space capable of housing the light interference filter between the base substrate and the lid;
   wherein the second substrate has an annular recessed portion provided on a surface opposite to the first substrate, the annular recessed portion is disposed outside of a light interference region where the first reflection film and the second reflection film overlap with each other, as viewed in a plan view of the first substrate and the second substrate seen from a direction of substrate thickness, the base substrate has a first base substrate and a second base substrate, the first base substrate being disposed between the second base substrate and the second substrate, the base substrate has a light transmission hole corresponding to a light transmission region, the light transmission hole having a first light transmission hole of the first base substrate and a second light transmission hole of the second base substrate, a first outer peripheral edge of the first light transmission hole overlaps with the annular recessed portion in the plan view, a second outer peripheral edge of the second light transmission hole is disposed inboard from the first outer peripheral edge in the plan view, and the surface opposite to the first substrate of the second substrate is joined to the base substrate.

2. The optical filter device according to claim 1, wherein the light interference filter has a gap change unit that changes a gap dimension between the first reflection film and the second reflection film.

3. The optical filter device according to claim 1, wherein the second substrate and the base substrate are joined together via an adhesive layer.

4. The optical filter device according to claim 1, wherein the annular recessed portion is located outside of the second outer peripheral edge in the plan view.

5. The optical filter device according to claim 1, further comprising a glass cover that is provided on a surface opposite to the second substrate of the base substrate and covers the light transmission hole, wherein the glass cover has a larger recessed portion than the light transmission hole, provided on a surface facing the base substrate, and the outer peripheral edge of the light transmission hole is situated inside the recessed portion.

6. The optical filter device according to claim 5, wherein the glass cover is joined to the base substrate via a spacer.

7. An optical module comprising:
a light interference filter having a first substrate, a second substrate facing the first substrate, a first reflection film provided on the first substrate, a second reflection film provided on the second substrate and facing the first reflection film, and a gap change unit that changes a gap dimension between the first reflection film and the second reflection film;
a casing having a base substrate that fixes the light interference filter, and a lid that is joined to the base substrate and forms an internal space capable of housing the light interference filter between the base substrate and the lid; and
a detection unit that detects light taken out by the light interference filter;
wherein the second substrate has an annular recessed portion provided on a surface opposite to the first substrate, the annular recessed portion is disposed outside of a light interference region where the first reflection film and the second reflection film overlap with each other, as viewed in a plan view of the first substrate and the second substrate seen from a direction of substrate thickness, the base substrate has a first base substrate and a second base substrate, the first base substrate being disposed between the second base substrate and the second substrate, the base substrate has a light transmission hole corresponding to a light transmission region, the light transmission hole having a first light transmission hole of the first base substrate and a second light transmission hole of the second base substrate, a first outer peripheral edge of the first light transmission hole overlaps with the annular recessed portion in the plan view, and a second outer peripheral edge of the second light transmission hole is disposed inboard from the first outer peripheral edge in the plan view, and the surface opposite to the first substrate of the second substrate is joined to the base substrate.

8. An electronic apparatus comprising:
a light interference filter having a first substrate, a second substrate facing the first substrate, a first reflection film provided on the first substrate, a second reflection film provided on the second substrate and facing the first reflection film, and a gap change unit that changes a gap dimension between the first reflection film and the second reflection film; and
a casing having a base substrate that fixes the light interference filter, and a lid that is joined to the base substrate and forms an internal space capable of housing the light interference filter between the base substrate and the lid;
wherein the second substrate has an annular recessed portion provided on a surface opposite to the first substrate, the annular recessed portion is disposed outside of a light interference region where the first reflection film and the second reflection film overlap with each other, as viewed in a plan view of the first substrate and the second substrate seen from a direction of substrate thickness, the base substrate has a first base substrate and a second base substrate, the first base substrate being disposed between the second base substrate and the second substrate, the base substrate has a light transmission hole corresponding to a light transmission region, the light transmission hole having a first light transmission hole of the first base substrate and a second light transmission hole of the second base substrate, a first outer peripheral edge of the first light transmission hole overlaps with the annular recessed portion in the plan view, and a second outer peripheral edge of the second light transmission hole is disposed inboard from the first outer peripheral edge in the plan view, and the surface opposite to the first substrate of the second substrate is joined to the base substrate.

* * * * *